United States Patent [19]

Ota et al.

[11] Patent Number: 4,733,947
[45] Date of Patent: Mar. 29, 1988

[54] MULTICOLOR LIQUID CRYSTAL DISPLAY PANEL

[75] Inventors: Takashi Ota, Komaki; Mikio Kariya, Nagoya, both of Japan

[73] Assignee: NGK Insulators, Ltd., Japan

[21] Appl. No.: 790,540

[22] Filed: Oct. 23, 1985

[30] Foreign Application Priority Data

Oct. 26, 1984 [JP] Japan .................. 59-162490[U]

[51] Int. Cl.⁴ .................. C03C 3/22; G02F 1/13
[52] U.S. Cl. .................. 350/334; 350/339 R; 501/4; 501/7; 501/8
[58] Field of Search .................. 350/339 F, 339 R; 501/7, 4, 8

[56] References Cited

U.S. PATENT DOCUMENTS

| | | | |
|---|---|---|---|
| 3,282,712 | 12/1966 | Tashiro et al. | |
| 3,507,737 | 4/1970 | Busdiecker et al. | 501/7 |
| 3,617,317 | 11/1971 | Sack et al. | 501/7 |
| 3,625,718 | 12/1971 | Petticrew | 501/7 |
| 3,656,984 | 4/1972 | Hoffman | 501/8 |
| 3,785,833 | 7/1974 | Rapp | 501/7 |
| 3,808,042 | 4/1974 | Dietz | 501/8 |
| 3,809,543 | 5/1974 | Gaskell et al. | 501/7 |
| 4,192,688 | 3/1980 | Babcock et al. | 501/7 |
| 4,310,598 | 1/1982 | Takami et al. | 501/7 |
| 4,365,021 | 12/1982 | Pirooz | 501/7 |
| 4,413,061 | 11/1983 | Kumar et al. | 501/7 |
| 4,415,672 | 11/1983 | Brennan et al. | 501/7 |
| 4,438,210 | 3/1984 | Rittler | 501/7 |
| 4,560,241 | 12/1985 | Stolov et al. | 350/339 F |
| 4,601,546 | 7/1986 | Ohta | 350/339 R |

FOREIGN PATENT DOCUMENTS 1382060 12/1964 France .

OTHER PUBLICATIONS

Proceedings of the S.I.D., vol. 24, No. 2, 1983, pp. 163-156, L.A. California, U.S.; T. Uchida et al.: "A Full-Color Matrix Liquid-Crystal Display with Color Layers on the Electrodes". European Search Report, EP 85 30 7711, dated 1-19-87.

Primary Examiner—John K. Corbin
Assistant Examiner—Martin Lerner
Attorney, Agent, or Firm—Parkhurst & Oliff

[57] ABSTRACT

A multicolor liquid crystal display panel including a first and a second transparent substrate sheet of glass, a color filter layer which forms a multiplicity of picture elements and which is interposed between the first and second sheets of glass, an electrode layer having picture-element electrodes corresponding to the picture elements, and a liquid crystal layer whose transmittance of light is locally varied by application of an electric field thereto through the picture-element electrodes. At least one of the first and second sheets of glass is formed of transparent glass ceramics or crystallized glass having a major crystalline phase which consists of crystals of a $Li_2O\text{-}Al_2O_3\text{-}SiO_2$ system.

8 Claims, 1 Drawing Figure

U.S. Patent   Mar. 29, 1988   4,733,947
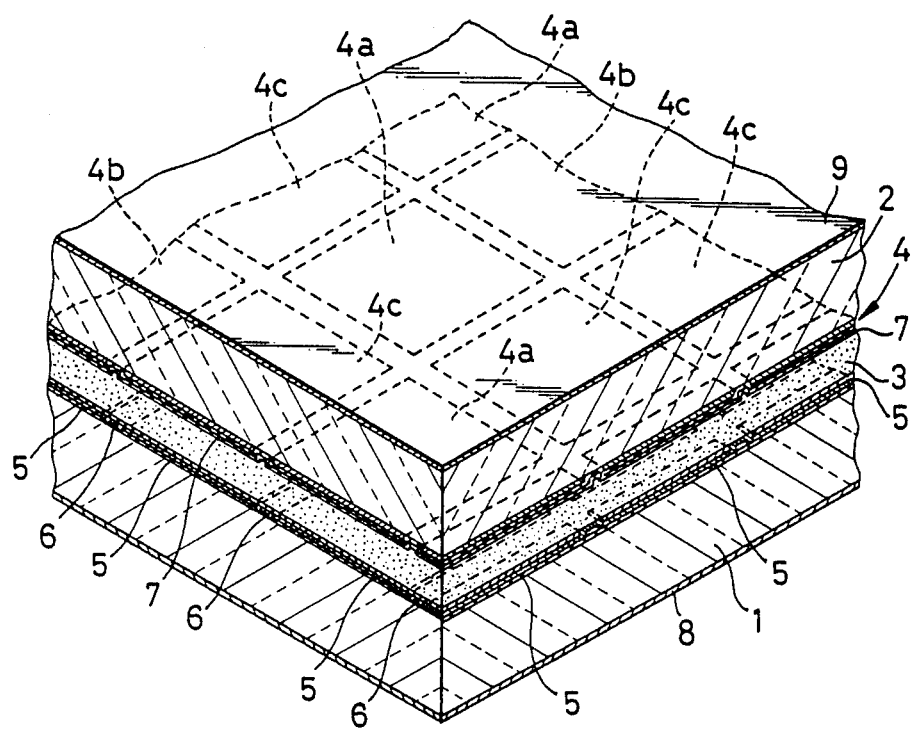

MULTICOLOR LIQUID CRYSTAL DISPLAY PANEL

BACKGROUND OF THE INVENTION

1. Field of the Art

The present invention relates to improvements in a multicolor or full-color liquid crystal display panel capable of effecting a color display of images by utilizing a liquid crystal material.

2. Related Art Statement

A pocket-sized or pocketable color-TV set is known, which uses a multicolor liquid crystal display panel. Such a liquid crystal display panel comprises: two transparent substrate sheets of glass; picture-element electrodes and a thin-film transistor (TFT) circuit which are formed on one of the two glass sheets; a color filter layer in the form of a checkered board consisting of red, blue and green filters which are formed on the other of the two glass sheets so as to provide individual picture elements (smallest divisions of an image); and a liquid crystal layer of twisted nematic type which is sealed in between the two glass sheets. It is needless to point out that the performance of this type of multicolor liquid crystal display panel depends largely upon an arrangement of the transistor circuit and the properties of the liquid crystal material used. For better performance of the display panel, however, considerations should also be given to the properties of the material of the transparent substrate glass sheets, which have appreciable effects on the quality of a display on the display panel. Namely, the glass material used for the transparent substrate sheets must meet various requirements. Firstly, the glass sheets should be substantially achromatic or transparent, having a high degree of transparency to the visible rays of light (in the visible region of wavelengths), in order to assure a clear color display of images, since the color display is accomplished by controlling amounts of light transmitted through individual parts or areas of the liquid crystal layer corresponding to the picture elements. The second requirement of the substrate glass sheets is concerned with a heat treatment process at a temperature around 600° C. during the manufacture of the panel, more precisely, in forming the picture-element electrodes and the thin-film transistor circuit. In this process of manufacture, the glass material must be free of deformation or cracks due to exposure to heat during the heat treatments. In the meantime, a thermal expansion of the transparent glass sheets will cause changes in electrical resistance and other properties of the thin-film transistors. To avoid such unfavourable changes, the glass material for the transparent substrate sheets must have a coefficient of thermal expansion as low as about $5 \times 10^{-7}$/°C. This is the third requirement of the glass material for the transparent substrate sheets of the display panel. A conventional multicolor liquid crystal display panel uses quartz glass, as a glass material that satsifies the above-addressed requirements. The liquid crystal display panels with transparent substrates of quartz glass are found satsifactory for the most part in their performance of display.

Problems Solved by the Invention

However, the quartz glass has a mechanical strength of 400–500 kg/cm², which is almost equal to that of a common soda-lime glass. Accordingly, the glass sheet made of quartz glass must be formed with a relatively large thickness to provide sufficient strength. The transparency of the transparent substrate sheet is reduced as its thickness is increased. Furthermore, the production cost of transparent substrates of quartz glass with a uniform thickness is greatly increased as their thickness is increased. Hence, the use of quartz glass makes it difficult to manufacture a large-sized liquid crystal display panel at a reduced cost.

SUMMARY OF THE INVENTION

It is accordingly an object of the present invention to provide a multicolor liquid crystal display panel which overcomes, as much as possible, the problems encountered in the known counterpart using transparent substrate sheets made of quartz glass.

According to the present invention, there is provided a multicolor liquid crystal display panel including a first and a second transparent substrate sheet of glass, a color filter layer which forms a multiplicity of picture elements interposed between the first and second sheets of glass, an electrode layer having picture-element electrodes corresponding to the picture elements, and a liquid crystal layer whose transmittance of light is locally varied by application of a controlled electric field thereto through the picture-element electrodes, characterized in that at least one of the first and second sheets of glass is formed of transparent glass ceramics or crystallized glass having a major crystalline phase which consists of crystals of a $Li_2O$—$Al_2O_3$—$SiO_2$ system.

According to an advantageous embodiment of the invention, the $Li_2O$—$Al_2O_3$—$SiO_2$ system consists esentially of beta-eucryptite, preferably having a crystal grain size of not greater than 0.1 micron.

The crystal grain size of the major crystalline phase of the glass ceramic may be held in a range of not greater than 0.1 micron, by suitably selecting the contents of nucleation agents to be included in the glass ceramic, and by controlling conditions of heat treatments of the glass ceramics during manufacture of the transparent substrate sheets of glass. According to a preferred embodiment of the invention, the above-indicated at least one of the first and second sheets of glass is produced by melting a mixture containing $Li_2O$, $Al_2O_3$ and $SiO_2$ to obtain a melt, forming the melt into a sheet, and subjecting the formed sheet to a preliminary heat treatment at a temperature of 650°–800° C. for 1–10 hours, and to a secondary heat treatment at a temperature of 800°–950° C. for 1–40 hours.

In accordance with another advantageous embodiment of the invention, the glass ceramic comprises 1.7–6% by weight of $Li_2O$, 12–35% by weight of $Al_2O_3$, and 55–75% by weight of $SiO_2$. In this instance, however, the total amount of $Li_2O$, $Al_2O_3$ and $SiO_2$ should not be less than 85% by weight. The glass ceramic may further comprise at least one nucleation aid or nucleus-forming aid such as $TiO_2$, $ZrO_2$ and $P_2O_5$. Preferably, the glass ceramics comprise 0–3% by weight of $TiO_2$, 0.1–5% by weight of $ZrO_2$ and/or 0–5% by weight of $P_2O_5$.

BRIEF DESCRIPTION OF THE DRAWING

The above and other objects, features and advantages of the present invention will be better undrestood from reading the following detailed description, when considered in connection with the accompanying drawing, in which the single FIGURE is a fragmentary view in perspective of a multicolor liquid crystal display panel embodying the invention.

DETAILED DESCRIPTION OF THE INVENTION

The present invention will be described in further detail with reference to the accompanying drawing. In the single FIGURE illustrating a part of a multicolor liquid crystal display panel, reference numeral 1 designates a first substrate sheet made of transparent glass ceramic or crystallized glass, while reference numeral 2 designates a second substrate sheet of the same glass ceramic as the first substrate sheet 1. Between these two transparent substrate sheets of glass ceramic 1, 2 (hereinafter referred to as "glass substrates"), there is interposed a sealed-in layer 3 of a liquid crystal material of twisted nematic type. The glass ceramic is a transparent crystallized glass composition which contains only small amounts of alkali components, and whose major crystalline phase consists of crystals of a $Li_2O$—$Al_2O_3$—$SiO_2$ system having a crystal grain size of not greater than 0.1 micron. Exaples 1, 2 and 3 of glass compositions for the glass substrates 1, 2 are given in the Table below, as non-limiting examples. For instance, the glass substrates 1, 2 may be produced in a process which comprises the steps of: mixing the components of a selected composition; melting the mixture to obtain a melt; forming the melt into a glass sheet of a 2-5 mm thickness; subjecting the formed glass sheet to a preliminary heat treatment at a temperature of 650°-750° C. for two hours; subjecting the glass sheet to a secondary heat treatment at a temperature of 800°-900° C. for two hours, so as to obtain fine precipitates of beta-eucryptite ($Li_2O \cdot Al_2O_3 \cdot SiO_2$) having a crystal grain size of not greater than 0.1 micron; and grinding the heat-treated glass sheet to a predetermined thickness, e.g., 0.5 mm.

| Compositions of Glass Material (in weight %) | | | |
|---|---|---|---|
| Example No. | 1 | 2 | 3 |
| $SiO_2$ | 67.7 | 72.3 | 74.3 |
| $Al_2O_3$ | 21.2 | 17.0 | 15.2 |
| $Li_2O$ | 2.5 | 2.6 | 2.2 |
| MgO | 0.9 | 3.1 | 3.1 |
| $TiO_2$ | 1.7 | 1.7 | 1.8 |
| $ZrO_2$ | 2.0 | 2.3 | 2.4 |
| ZnO | 3.0 | — | — |
| $As_2O_3$ | 0.5 | 0.5 | 0.5 |
| $Sb_2O_3$ | 0.5 | 0.5 | 0.5 |
| Major Crystalline Phase | Beta-eucryptite having a crystal grain size of not greater than 0.1 micron | | |

Generally, glass ceramic materials (crystallized glass) having a major crystalline phase consists of a $Li_2O$—$Al_2O_3$—$SiO_2$ system have a relatively low coefficient of thermal expansion. In particular, glass ceramics having a $Li_2O$—$Al_2O_3$—$SiO_2$ system consisting essentially of beta-eucryptite (mole proportions of $Li_2O$, $Al_2O_3$ and $SiO_2$ being 1:1:2) have a thermal expansion coefficient of not more than $5 \times 10^{-7}/°C$., which is equal to or lower than that of quartz glass. Accordingly, the use of glass ceramics is desired as it will not cause a variation in electrical resistance of a thin-film transistor circuit 6 (which will be described) of the liquid crystal display panel. Generally, the glass ceramic material comprises at least 85% by weight of $Li_2O$, $Al_2O_3$ and $SiO_2$ in total. Preferably, the glass ceramic comprises 1.7–6% by weight of $Li_2O$, 12–35% by weight of $Al_2O_3$ and 55–75% by weight of $SiO_2$, as previously indicated. For adjusting the viscosity of the melt of the glass composition for better formation of a glass sheet which is heat-treated into the glass substrates 1, 2, MgO, ZnO and other suitable agents may be present in a maximum total amount of about 3%. Further, nucleation or nucleus-forming aids for facilitating formation of fine crystals, such as $TiO_2$, $ZrO_2$ and $P_2O_5$ may be used. Preferably, the glass ceramic comprises 0–3% by weight of $TiO_2$, 0.1–5% by weight of $ZrO_2$ and/or 0.5% by weight of $P_2O_5$. By suitably selecting the contents of these nuculeation aids and properly controlling the conditions of heat treatments of the formed glass sheet, the obtained glass substrates 1, 2 may be given a major crystalline phase which has a maximum crystal grain size of 0.1 micron, which is far smaller than wavelengths of the visible rays. In this connection, it is recommended that the heating of the formed glass sheet for their heat treatments be conducted at a rate of 300° C./hour or lower. The glass substrates 1, 2 of such a small crystal grain size have an increased transmittance of visible red, blue and green beams of light, and are therefore suitable for full-color display of images. Further, it will be understood that the mechanical strength of the crystallized glass or glass ceramic is increased as the crystal grain size is reduced. The glass ceramic used according to the invention has a mechanical strength of 1000–1200 $kg/cm^2$, which is two to three times as high as that of a quartz glass. Therefore, the thickness of the glass substrates 1, 2 may be reduced to one half or smaller of that of a known substrate sheet made of a quartz glass, whereby the transparency of the glass subtrates 1, 2 may be further improved. In illustrated Examples 1–3, $As_2O_3$ and $Sb_2O_3$ are used as anti-bubble agents. Preferably, these anti-bubble agents are included in a total amount of up to 2%.

The liquid crystal display panel shown in the FIGURE is provided with a multiplicity of picture elements which are regularly arranged to provide dots of red, blue and green colors. This array of picture elements is constituted by: a color filter layer 4 formed on the inner surface of the second glass substrate 2; an electrode layer having transparent picture-element electrodes 5 which are formed on the inner surface of the first glass substrate 1 with a sputtering method; the previously indicated thin-film transistor circuit 6 having thin-film transistors (not shown) formed adjacent to the corresponding picture-element electrodes 5; and the previously indicated twisted nematic liquid crystal layer 3 interposed between the first and second glass substrates 1, 2. The color filter layer 4 consists of a multiplicity of red, blue and green filters 4a, 4b and 4c which are regularly arranged corresponding to the picture-element electrodes 5. A transparent common electrode 7 is formed on the inner surface of the color filter layer 4. The outer surfaces of the first and second glass substrates 1, 2 are covered with polarizer plates 8, 9, respectively. These polarizer plates 8, 9 are disposed such that their axes of polarization are perpendicular to each other.

In the liquid crystal display panel thus constructed, the plane of polarization of light incident to the panel is rotated through 90 degrees by the liquid crystal layer 3 between the first and second glass substrates 1, 2, while there is no voltage applied between the picture-element electrode 5 and the common electrode 7. Hence, a beam of light may be transmitted through the polarizer plates 8 and 9 which have the mutually perpendicular axes of polarization. More specifically, the light beam is transmitted through a part of the liquid crystal layer 3 which corresponds to the picture-element electrode 5 in question, and therefore through the corresponding color filter 4a, 4b or 4c, that is, through the corresponding picture element, while no voltage is applied between the picture-element electrode 5 and the common electrode 7. When the thin-film transistor of the circuit 6 corresponding to the given picture element (color filter 4a, 4b, 4c) is operated according to a video signal, a controlled voltage is applied between the corresponding picture-element electrode 5 and the common electrode 7, whereby the orderly arrangement of the molecules of nematic liquid crystals of the corresponding part of the liquid crystal layer 3 is changed such that the liquid crystal molecules tend to be lined up in the direction of an electric field produced by application of the voltage (in the direction perpendicular to the plane of the picture-element electrode layer). As a result, the corresponding part of the liquid crystal layer 3 serves as a shutter for controlling an amount of light transmitted through the corresponding picture element, according to a magnitude of the voltage applied. The beam of light transmitted through the corresponding part of the liquid crystal layer 3 is transmitted through the corresponding color filter 4a, 4b, 4c, thereby actuating the picture element in red, blue or green color with a controlled amount of light transmission. Since the transparent glass substrates 1, 2 made of a glass ceramic of a comparatively high strength are formed with a smaller thickness as compared with the known transparent glass substrate sheet, the transparency of the glass substrates 1, 2 of the instant display panel is improved to a considerable extent, permitting the picture element to provide a clear color dot. Further, since the glass substrates 1, 2 are formed of glass ceramic or crystallized glass with its major crystalline phase consisting of crystals of a $Li_2O$—$Al_2O_3$—$SiO_2$ system, and their thermal expansion coefficient is as low as about $5 \times 10^{-7}/°C$., the variation in electrical resistance of the thin-film transistors due to thermal expansion of the glass substrates 1, 2 may be held to a minimum. In addition, the glass substrates 1, 2 are highly resistant to heat, having a softening point of 900°–1000° C. Consequently, the glass substrates 1, 2 will not undergo thermal deformation or cracking during formation of the picture-element electrodes 5 and thin-film transistors at temperatures around 600° C. Freedom of the substrates 1, 2 from such defects assures a distortion-free reproduction of a color image on the display panel. Furthermore, with the glass substrates 1, 2 of glass ceramics, alkali ions (e.g., $Na^+$ and $K^+$) will not migrate into the liquid crystal, and therefore will not influence the operation of the liquid crystal material, while a voltage is applied between the electrodes 5 and 7. Further, the glass ceramics used for the glass substrates 1, 2 is easily formable into a sheet, like a soda-lime glass material, and is therefore suitable for economical production of a glass sheet of a size larger than $300 \times 300$ mm. While the illustrated embodiment of the display panel uses glass ceramics for both of the first and second transparent substrate sheets 1, 2, it is possible that the first glass substrate 1 is made of quartz or other transparent glass materials otehr than glass ceramics (crystallized glass) if the first glass substrate 1 is expected to be subject to comparatively severe thermal conditions. In this case, too, the second glass substrate 2 made of glass ceramics enjoys the aforementioned advantages, which include high degrees of transparency, strength and heat resistance, and a low thermal expansion coefficient, which are conducive to improvement in operating performance of the liquid crystal display panel. Further, the glass ceramics is chemically stable, i.e., free of migration of $Na^+$ ions into the liquid crystal layer 3, and its thermal expansion coefficient may be easily adjusted by controlling an amount of precipitated crystals. These features of the glass ceramic permit the glass substrate(s) to better match the color filter layer 4, picture-element electrode layer 5, liquid crystal layer 3, etc.

As is apparent from the foregoing description, the glass substrates of the illustrated multicolor liquid crystal display panel are formed of a transparent glass ceramic material which has been described in detail, in place of the conventionally used quartz glass. The transparent substrates of the glass ceramic permit a clearer color display of images, than obtained in the conventional display panel, and contribute to reduction in manufacturing cost of the display panel. In addition, the transparent substrates of the described glass ceramics have minimum adverse physical and chemical influences on the liquid crystal layer, thin-film transistor circuit 6, and other layers of the display panel, enabling the display panel to serve for a long time. Thus, the multicolor liquid crystal display panel of the invention substantially eliminates the problems experienced in the prior art. These are industrially significant aspects of the present invention.

While the invention has been described above in detail and with reference to specific embodiments thereof, it will be apparent to one skilled in the art that various changes and modifications can be made therein without departing from the spirit and scope thereof.

What is claimed is:

1. A multicolor liquid crystal display panel comprising:
   a first and a second transparent subtrate sheet of glass, wherein at least one of said first and second sheets of glass is formed of a transparent glass ceramic having a major crystalline phase of crystals of a $Li_2O$—$Al_2O_3$—$SiO_2$ system, said crystals comprising beta-eucryptite crystals having a crystal grain size which is not greater than 0.1 microns;
   a color filter layer forming a plurality of picture elements;
   an electrode layer having picture-element electrodes corresponding to the picture elements; and
   a liquid crystal layer, the transmittance of light through which is locally varied by application of an electric field thereto through the picture-element electrodes;
   wherein said color filter layer, said electrode layer and said liquid crystal layer are interposed between the first and second sheets of glass.

2. The multicolor liquid crystal display panel of claim 1, wherein said at least one of the first and second sheets of glass is produced by melting a mixture containing $Li_2O$, $Al_2O_3$ and $SiO_2$ to obtain a melt, forming the melt into a sheet, and subjecting the formed sheet to a preliminary heat treatment at a temperature of 650°–800° C. for 1–10 hours, and to a secondary heat treatment at a temperature of 800°–950° C. for 1–40 hours.

3. The multicolor liquid crystal display panel of claim 1, wherein at least 85% of said glass ceramic comprises 1.7–6% by weight of $Li_2O$, 12–35% by weight of $Al_2O_3$, and 55–75% by weight of $SiO_2$.

4. The multicolor liquid crystal display panel of claim 3, wherein said glass ceramic further comprises as a nucleation aid at least one material selected from the group consisting of 0–3% by weight of $TiO_2$, 0.1–5% by weight of $ZrO_2$, and 0–5% by weight of $P_2O_5$.

5. A method of manufacturing a multicolor liquid crystal display panel comprising:

providing a first and a second transparent substrate sheet of glass, wherein at least one of said first and second sheets of glass is formed of a transparent glass ceramic having a major crystalline phase of crystals of a $Li_2O$—$Al_2O_3$—$SiO_2$ system, said crystals comprising beta-eucryptite crystals having a crystal grain size which is not greater than 0.1 micron;

providing a color filter layer which forms a plurality of picture elements;

providing an electrode layer which has picture-element electrodes corresponding to the picture elements;

providing a liquid crystal layer, the transmittance of light through which is locally varied by application of an electric field thereto through said picture-element electrodes; and interposing said color filter layer, said electrode layer and said liquid crystal layer between said first and second sheets of glass.

6. The method of claim 5, wherein said at least one of said first and second sheets of glass is produced by melting a mixture containing $Li_2O$, $Al_2O_3$ and $SiO_2$ to obtain a melt, forming the melt into a sheet, subjecting the formed sheet to a preliminary heat treatment at a temperature of 650°–800° C. for 1–10 hours, and subjecting the formed sheet to a secondary heat treatment at a temperature of 800°–950° C. for 1–40 hours.

7. The method of claim 6, wherein at least 85% by weight of said glass ceramic comprises 1.7–6% by weight of $Li_2O$, 12–35% by weight of $Al_2O_3$, and 55–75% by weight of $SiO_2$.

8. The method of claim 6, wherein said glass ceramic further comprises as a nucleation aid, at least one material selected from the group consisting of 0–3% by weight of $TiO_2$, 0.1–5% by weight of $ZrO_2$, and 0–5% by weight of $P_2O_5$.

* * * * *